United States Patent [19]
Tarodo et al.

[11] Patent Number: 6,137,697
[45] Date of Patent: Oct. 24, 2000

[54] UNIVERSAL SWITCHED POWER CONVERTER WITH DEMAGNETISING

[75] Inventors: Antonio Fontan Tarodo, Madrid, Spain; Enrique De La Cruz Moreno, Paris, France; Salvador Ollero Velasco, Madrid, Spain

[73] Assignee: Alcatel, Paris, France

[21] Appl. No.: 09/440,058

[22] Filed: Nov. 15, 1999

[30] Foreign Application Priority Data

Nov. 16, 1998 [ES] Spain ............................ 9802398

[51] Int. Cl.⁷ .............................................. H02M 3/335
[52] U.S. Cl. .................................... 363/21; 363/71
[58] Field of Search ........................ 363/210, 71, 97, 363/131

[56] References Cited

U.S. PATENT DOCUMENTS

| | | | |
|---|---|---|---|
| 4,386,311 | 5/1983 | Bafaro | 363/97 |
| 4,695,935 | 9/1987 | Oen et al. | 363/21 |
| 5,019,954 | 5/1991 | Bourgeault et al. | 363/71 |
| 5,414,610 | 5/1995 | Brainard | 363/21 |
| 5,567,997 | 10/1996 | Suzuki et al. | 363/71 |
| 5,621,630 | 4/1997 | Suzuki et al. | 363/71 |

*Primary Examiner*—Jeffrey Sterrett
*Attorney, Agent, or Firm*—Sughrue, Mion, Zinn, Macpeak & Seas, PLLC

[57] ABSTRACT

Universal switched power converter connected to a voltage source and, based on the level of the voltage received, this is applied to a first primary circuit comprising a first switching device (14-1) or to a second primary circuit comprising a second switching device (15-1). Control means (PWM) adapt the conducting period of the switching device connected to input terminals for regulating an output voltage and adapt the conducting period of the switching device not connected to the input terminals for demagnetising the core of a transformer (T) during the non-conducting period of the switching device connected to the input terminals.

9 Claims, 1 Drawing Sheet

6,137,697

UNIVERSAL SWITCHED POWER CONVERTER WITH DEMAGNETISING

OBJECT OF THE INVENTION

The present invention relates to a universal switched power converter to which a broad range of voltage levels, both AC and DC, can be applied, and that converts the received voltage into a regulated voltage level suitable for feeding to at least one load, in telecommunications for example.

As a result, the universal switched power converter is very versatile, its overall performance is high and its operation and control are straightforward.

STATE OF THE ART

A switched power converter to be connected indistinctly to an alternating current (AC) mains line or to a direct current (DC) source, and for converting the voltage received into a suitable voltage for a load, is known from the U.S. Pat. No. 5,414,610, being incorporated in the present application by reference.

According to the power converter proposed in this document, it comprises a first pair of input terminals to which a voltage from an AC mains supply is applied, and a second pair of input terminals to which is applied a voltage from a DC voltage source; the applied voltage being converted to a suitable voltage level for a load.

Each of the above pairs of input terminals is connected, respectively, to a primary circuit comprising a switching device; control means control the switching action of the two switching devices for storing energy in at least one primary winding of a transformer during the conducting period of both switching devices, said switching devices being switched simultaneously, i.e. their conducting and non-conducting periods coincide; and said energy is released into a secondary winding of the transformer for applying the voltage level to the load during the non-conducting period of said switching devices.

The power converter proposed in the U.S. Pat. No. 5,414,610 employs the transformer inefficiently due to the operating mode of the switching devices.

As a result, the overall performance of the power converter is poor, and constitutes a drawback for applications in which compact, high performance devices are required.

Consequently there exists a need to develop a switched power converter comprising a reduced number of switching elements and having a high overall performance.

CHARACTERISATION OF THE INVENTION

The universal switched power converter of the present invention offers a high overall performance working from a broad range of input voltages, being consequently very versatile, and provides an output voltage with a fast response to load variations; and it comprises input terminals to which a first voltage from an AC or DC voltage source is applied, and said input terminals are connected to a first primary circuit or a second primary circuit through selection means, depending on the level of the applied voltage.

Each of the primary circuits comprises, respectively, a storage capacitor connected in parallel with a series combination of a primary winding and a switching device. One of said primary circuits comprises a first rectifier means since it will be connected to an AC voltage source.

The two primary windings together with at least one secondary winding form a transformer, such that the secondary winding is connected to a second rectifier means, and produces at its output a rectified voltage which is filtered in a filtering means, and produces at its output a second regulated voltage for applying to a load.

A single control means and based on a signal that represents the second voltage, adapts the conducting period of the switching device belonging to the primary circuit connected to the input terminals for regulating the second voltage in the event of load variations, and also adapts the conducting period of the switching device belonging to the primary circuit not connected to said input terminals, for demagnetising the transformer core and for avoiding its saturation, during the non-conducting period of the switching device connected to the input terminals.

Consequently, the two switching devices are switched in a complementary manner, and the primary circuit not connected to the input terminals works as a demagnetising circuit, like an active lock, of the energy stored in the transformer core.

BRIEF DESCRIPTION OF THE FIGURES

A more detailed explanation of the invention is provided in the following description, based on the attached figures, in which.

DESCRIPTION OF THE INVENTION

Figure 1:
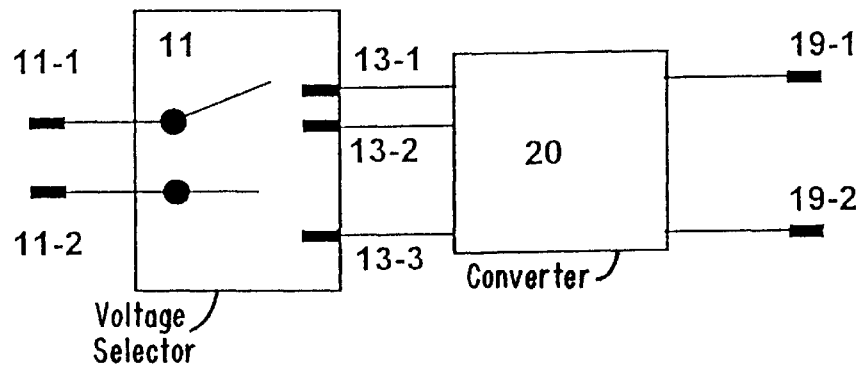
FIG. 1 shows a functional block diagram of a universal switched power converter according to the invention.

FIG. 1 shows a simplified block diagram of the universal switched power converter that converts a first voltage applied from a voltage source across input terminals 11-1, 11-2 to a second voltage across output terminals 19-1, 19-2.

The voltage source, which can be an AC mains line or a DC voltage supply, provides the first voltage, and, based on the characteristics of this voltage, selection means 11 connect the input terminals 11-1, 11-2 automatically to a first pair of conductors 13-1, 13-3 or to a second pair of conductors 13-2, 13-3.

The first pair of conductors 13-1, 13-3 is adapted to receive a range of AC voltages, and the second pair of conductors 13-2, 13-3 is adapted to receive a range of DC voltages, respectively. The conductor 13-3 represents the common voltage reference level for the universal switched power converter.

Figure 2:
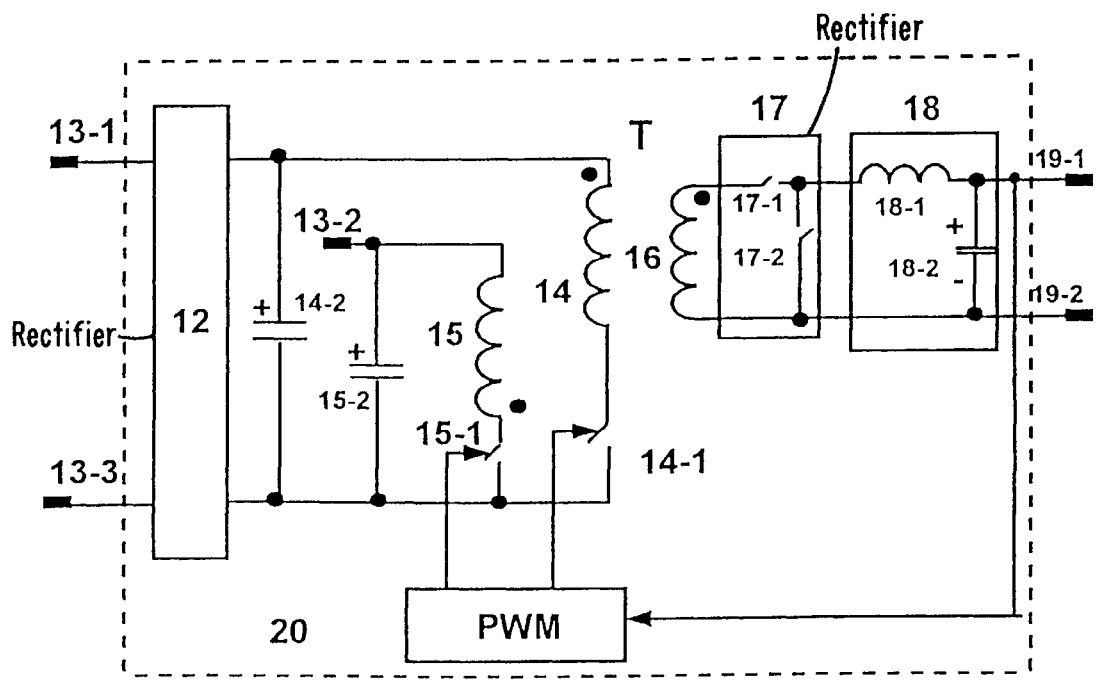
FIG. 2 shows, in schematic form, an embodiment of a switched power converter according to the invention.

FIG. 2 is a detailed electrical schematic of a circuit corresponding to a preferred embodiment of the switched power converter 20, which comprises a first and a second primary circuit, a secondary circuit and an output voltage loop.

The first primary circuit comprises first rectifier means 12 connected in parallel with the first pair of conductors 13-1, 13-3, and its output is connected to a first storage capacitor 14-2, which is connected in parallel with a series combination of a first primary winding 14 and a first switching device 14-1, for example a field effect transistor, or MOSFET.

The second primary circuit is connected to the second pair of conductors 13-2, 13-3, and comprises a second storage capacitor 15-2 connected in parallel with said conductors 13-2, 13-3, and also connected in parallel with a series combination of the second primary winding 15 and of a second switching device 15-1, for example, a field effect transistor, or MOSFET.

A transformer T comprises at least the first primary winding 14, the second primary winding 15 and a secondary winding 16.

When the input terminals 11-1, 11-2 receive an AC voltage they are respectively connected to the first pair of conductors 13-1 and 13-3, so that the first rectifier 12, for example a full-wave rectifier, rectifies the AC voltage applied from the AC mains line, and produces at its output a rectified sine wave voltage that is filtered by the first capacitor 14-2 and is fed to the first winding 14 to be transferred directly to the secondary winding 16 during the time the first switching device 14-1 is conducting.

The secondary side of the converter 20 comprises the secondary winding 16 connected in parallel with second rectifier means 17 the output of which is connected to filter means 18 for filtering the rectified voltage. The output of the filter 18 is applied to the output terminals 19-1, 19-2 of the universal switched power converter.

The second rectifier 17 rectifies the voltage received from the secondary winding 16 and, once filtered, the second voltage suitable for a load is produced across output terminals 19-1, 19-2.

The second rectifier 17 is formed by a first and a second rectifier arms 17-1 and 17-2, respectively, where the first branch 17-1 is the actual rectifier arm and the second arm 17-2 is the free-flow rectifier arm, working as a synchronous rectifier, the operation of which is not described as it is known in the state of the art. The second rectifier 17 can comprise means for operating as a self-driven synchronous rectifier.

The output voltage loop through control means like a pulse width modulator PWM adapts the conducting period of the switching device connected to the input terminal 11-1 for regulating the voltage level across the output terminals 19-1, 19-2; and adapts the conducting period of the switching device not connected to the input terminal 11-1 for demagnetising the transformer T preventing its core from becoming saturated, during the non-conducting period of the switching device connected to the input terminal 11-1.

To do this, the pulse width modulator PWM receives a signal that represents the voltage level on one output terminal 19-1, and generates respectively the conducting period of each of the switching devices.

As a result, the two switching devices 14-1 and 15-1 are switched in a complementary manner by the pulse width modulator PWM.

The demagnetising of the transformer T is carried out during the non-conducting period of the switching device connected to the input terminal 11-1, so that a discharge path is formed through the second primary circuit which discharges the energy stored in the core of the transformer T, charging and discharging the second capacitor 15-2, for which purpose the second switching device 15-1 is brought into conduction. Afterwards a storage capacitor 18-2, included in the filter 18, applies the voltage level to the output terminals 19-1, 19-2.

From the foregoing description, it can be deduced that when the terminal 11-1 is connected to the line 13-1, the discharge circuit is formed by the second primary circuit, and when the terminal 11-1 is connected to the line 13-2, the discharge circuit is formed by the first primary circuit.

In another embodiment of the converter 20, the input terminals 11-1, 11-2 can receive the first voltage from a DC voltage source, so that the conductors 13-1, 13-3 are directly connected to the first primary circuit, i.e. the rectifier 12 is not present. The operation of the converter 20 is analogous to that previously described.

Consequently, the universal switched power converter of the invention works as a forward converter, with active locking.

In the operating mode in which the input terminals 11-1, 11-2 receive the first voltage from a DC voltage source, its level being different to that previously mentioned, they are respectively connected to the second pair of conductors 13-2, 13-3 by the selection means 11.

The DC voltage applied is filtered by the second capacitor 15-2, and the second primary winding 15 stores energy during the conducting period of the second switching device 15-1. The second rectifier 17 then rectifies the current fed to the capacitor 18-2 for producing the second voltage across the output terminals 19-1, 19-2.

During the non-conducting period of said second switching device 15-1, the second primary winding 15 releases the energy stored during the conducting period to the secondary winding 16, and the current which flows through said winding is rectified by the second rectifier 17, and produces at its output a rectified voltage to be filtered by the filter 18, supplying the second voltage across the output terminals 19-1, 19-2.

In this operating mode, the first primary circuit provides a discharge path for the energy stored in the core of the transformer T, charging and discharging the first capacitor 14-2, for which purpose the first switching device 14-1 is brought into conduction.

The universal switched power converter of the invention works as a flyback converter, with active locking and with its output in forward mode, when the first primary circuit provides the discharge path for the energy stored in the core of the transformer T.

As a result of the foregoing description, the universal switched power converter offers a high overall performance, a high degree of integration (compact in size), and its cost is low in comparison with conventional AC/DC or DC/DC converters, as a result of the fact that duplication of the circuitry on the primary side greatly improves the converter efficiency under certain operating conditions and provides it with great operational versatility through being able to work with a wide range of input voltages, it therefore being of particular application for markets where the characteristics of the voltage source can suffer variations in supply.

In another embodiment it is possible to connect an auxiliary load in parallel with the storage capacitor of the primary circuit that provides the discharge path for the energy stored in the core of the transformer T.

What is claimed is:

1. Universal switched power converter, comprising input terminals (11-1, 11-2) for receiving a first voltage from a voltage source, applying it to a first primary circuit comprising a first switching device (14-1), or to a second primary circuit comprising a second switching device (15-1); a transformer (T) comprising at least a first primary winding (14), a second primary winding (15) and a secondary winding (16); a control means (PWM) that determines the conducting periods of said first switching device (14-1) and of said second switching device (15-1); characterised in that said control means (PWM) adapts the conducting period of the switching device connected to said input terminals (11-1, 11-2) for regulating a second voltage across output terminals (19-1, 19-2); and adapts the conducting period of the switching device not connected to said input terminals (11-1, 11-2) for demagnetising said transformer (T) during the non-conducting period of the switching device connected to said input terminals (11-1, 11-2).

2. Power converter according to claim 1, characterised in that selection means (11) connect said input terminals (11-1, 11-2) to a first pair of conductors (13-1, 13-3) or to a second pair of conductors (13-2, 13-3), based on the level of said first voltage applied through said input terminals (11-1, 11-2).

3. Power converter according to claim 1, characterised in that said first primary circuit comprises a first storage capacitor (14-2) connected in parallel with a series combination of said first primary winding (14) and said first switching device (14-1).

4. Power converter according to claim 3, characterised in that said first primary circuit is connected to said input terminals (11-1, 11-2) through said first pair of conductors (13-1, 13-3) for functioning as a forward converter, and said second primary circuit functions as an active locking circuit.

5. Power converter according to claim 1, characterised in that said second primary circuit comprises a second storage capacitor (15-2) connected in parallel with a series combination of said second primary winding (15) and said second switching device (151).

6. Power converter according to claim 5, characterised in that said second primary circuit is connected to said input terminals (11-1, 11-2) through said second pair of conductors (13-2, 13-3) for functioning as a flyback converter, and said first primary circuit functions as an active locking circuit.

7. Power converter according to the claim 1, characterised in that said secondary winding (16) is connected in parallel with a rectifier means (17) for rectifying a current that flows through said secondary winding (16), and produces at its output a rectified voltage to be filtered in filtering means (18) for producing said second voltage across said output terminals (19-1, 19-2).

8. Power converter according to claim 7, characterised in that said rectifier means (17) comprises means for functioning as a self-excited synchronous rectifier.

9. Power converter according to claim 2, characterised in that it comprises a rectifier means (12) connected in parallel with said first pair of conductors (13-1, 13-3) for rectifying said first applied voltage.

* * * * *